United States Patent
Ko et al.

(10) Patent No.: US 9,967,897 B2
(45) Date of Patent: *May 8, 2018

(54) APPARATUSES AND METHODS FOR COORDINATION BETWEEN PLURALITY OF CO-LOCATED WIRELESS COMMUNICATION MODULES VIA ONE WIRE

(71) Applicant: MediaTek Inc., Hsin-Chu (TW)

(72) Inventors: Li-Chun Ko, Taipei (TW); Hong-Kai Hsu, New Taipei (TW); I-Lin Hsieh, Hsinchu (TW); Jwo-An Lin, Taipei (TW); I-Kang Fu, Taipei (TW); Huanchun Ye, Cupertino, CA (US)

(73) Assignee: MEDIATEK INC., Hsin-Chu (TW)

( * ) Notice: Subject to any disclaimer, the term of this patent is extended or adjusted under 35 U.S.C. 154(b) by 82 days.

This patent is subject to a terminal disclaimer.

(21) Appl. No.: 14/255,120

(22) Filed: Apr. 17, 2014

(65) Prior Publication Data

US 2014/0226643 A1 Aug. 14, 2014

Related U.S. Application Data

(63) Continuation of application No. 13/218,940, filed on Aug. 26, 2011, now Pat. No. 8,744,356, which is a
(Continued)

(51) Int. Cl.
*H04Q 7/10* (2006.01)
*H04W 72/12* (2009.01)
(Continued)

(52) U.S. Cl.
CPC ..... *H04W 72/1215* (2013.01); *H04W 28/044* (2013.01); *H04W 84/12* (2013.01);
(Continued)

(58) Field of Classification Search
CPC ........ H04W 72/1215; H04W 72/1242; H04W 88/06; H04W 72/00
(Continued)

(56) References Cited

U.S. PATENT DOCUMENTS 7,103,390 B2   9/2006 Kostiainen
7,519,039 B2 * 4/2009 Carter et al. .................. 370/338
(Continued)

FOREIGN PATENT DOCUMENTS

CN   101132368    2/2008
CN   101547028 A  9/2009
(Continued)

OTHER PUBLICATIONS

PCT Search Report dated Dec. 8, 2011.
(Continued)

*Primary Examiner* — Ankur Jain
*Assistant Examiner* — Julio Perez
(74) *Attorney, Agent, or Firm* — McClure, Qualey & Rodack, LLP

(57) ABSTRACT

The invention provides a mobile communication device having a first wireless communication module with a strong driving circuit, and a second wireless communication module with a weak driving circuit. The first wireless communication module is coupled to the second wireless communication module via only one wire. The first wireless communication module sends a first traffic pattern of a first wireless transceiving to the second wireless communication module via the wire, and receives a second traffic of a second wireless transceiving from the second wireless communication module via the wire. The second traffic pattern indicates whether the second wireless communication module decides to use a remaining period of time, in which the first wireless
(Continued)

communication module is not required to perform wireless transceiving, for the second wireless transceiving.

22 Claims, 14 Drawing Sheets

Related U.S. Application Data continuation-in-part of application No. 12/056,335, filed on Mar. 27, 2008, now abandoned.

(60) Provisional application No. 61/385,657, filed on Sep. 23, 2010, provisional application No. 61/377,750, filed on Aug. 27, 2010.

(51) Int. Cl.
| | |
|---|---|
| *H04W 84/12* | (2009.01) |
| *H04W 88/06* | (2009.01) |
| *H04W 28/04* | (2009.01) |
| *H04M 1/60* | (2006.01) |
| *H04W 74/00* | (2009.01) |
| *H04W 84/18* | (2009.01) |
| *H04W 88/04* | (2009.01) |

(52) U.S. Cl.
CPC .......... *H04W 88/06* (2013.01); *H04M 1/6066* (2013.01); *H04W 74/004* (2013.01); *H04W 74/006* (2013.01); *H04W 84/18* (2013.01); *H04W 88/04* (2013.01); *Y02B 60/50* (2013.01)

(58) Field of Classification Search
USPC ................. 455/41.2, 553.1; 370/338–346
See application file for complete search history.

(56) References Cited

U.S. PATENT DOCUMENTS

| | | | |
|---|---|---|---|
| 7,938,329 B2* | 5/2011 | Tran | G06K 7/0008 235/451 |
| 7,966,037 B2 | 6/2011 | Rayzman et al. | |
| 2004/0147223 A1 | 7/2004 | Cho | |
| 2004/0192222 A1 | 9/2004 | Vaisanen et al. | |
| 2004/0233917 A1* | 11/2004 | Rocas | H04L 5/1446 370/395.62 |
| 2005/0239497 A1 | 10/2005 | Bahl et al. | |
| 2005/0276241 A1 | 12/2005 | Kamerman et al. | |
| 2006/0133334 A1 | 6/2006 | Ross | |
| 2006/0274704 A1 | 12/2006 | Desai et al. | |
| 2007/0224936 A1 | 9/2007 | Desai | |
| 2007/0230648 A1* | 10/2007 | Gupta | H04L 7/033 375/371 |
| 2007/0275746 A1 | 11/2007 | Bitran | |
| 2008/0233875 A1* | 9/2008 | Desai | H04W 16/14 455/41.2 |
| 2008/0318630 A1* | 12/2008 | Gil | H04W 72/1215 455/561 |
| 2009/0081962 A1* | 3/2009 | Sohrabi | H04W 72/1242 455/79 |
| 2009/0137206 A1 | 5/2009 | Sherman et al. | |
| 2009/0201862 A1* | 8/2009 | Okker | H04W 72/1242 370/329 |
| 2009/0245279 A1 | 10/2009 | Wan et al. | |
| 2009/0247217 A1 | 10/2009 | Hsu et al. | |
| 2014/0226643 A1 | 8/2014 | Ko et al. | |

FOREIGN PATENT DOCUMENTS

| | | |
|---|---|---|
| EP | 1 605 643 | 12/2005 |
| EP | 1 860 833 | 11/2007 |
| TW | 200721764 | 6/2007 |
| TW | 200742300 | 11/2007 |
| WO | WO 2005/020518 | 3/2005 |
| WO | WO 2008/001272 | 1/2008 |

OTHER PUBLICATIONS

English language translation of abstract of TW 200721764 (published Jun. 1, 2007).

English language translation of abstract of CN 10132368 (published Feb. 27, 2008).

* cited by examiner

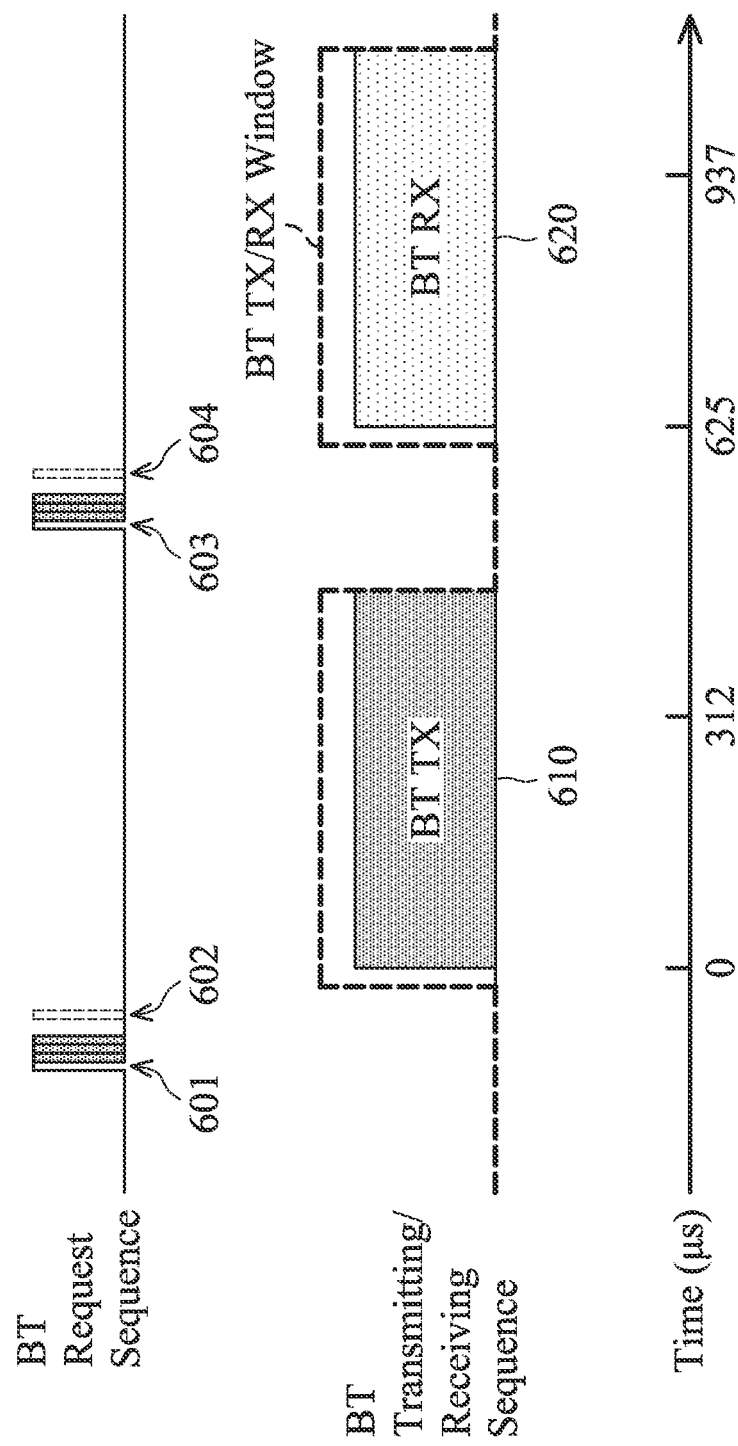

APPARATUSES AND METHODS FOR COORDINATION BETWEEN PLURALITY OF CO-LOCATED WIRELESS COMMUNICATION MODULES VIA ONE WIRE

CROSS REFERENCE TO RELATED APPLICATIONS

This application is a Continuation of U.S. application Ser. No. 13/218,940, filed on Aug. 26, 2011, which is a Continuation-In-Part of U.S. application Ser. No. 12/056,335, filed on Mar. 27, 2008, and the entireties of which are incorporated by reference herein. The U.S. application Ser. No. 13/218,940 claims the benefit of U.S. Provisional Applications No. 61/377,750 filed on Aug. 27, 2010, and No. 61/385,657 filed on Sep. 23, 2010, and the entireties of which are incorporated by reference herein.

BACKGROUND OF THE INVENTION

Field of the Invention

The invention relates to coordination between a plurality of wireless communication modules, and more particularly to apparatuses and methods for coordination between a plurality of co-located wireless communication modules via only one wire.

Description of the Related Art

To an increasing extent, a multitude of communication functions are being merged into mobile devices. As shown in FIG. 1, a cellular phone may connect to a Wireless Local Area Network (WLAN) via a Wireless Fidelity (WiFi) module thereof and simultaneously communicate with a Bluetooth headset (or a Bluetooth car audio, or others) through a Bluetooth module thereof. A WLAN system is typically implemented inside buildings as an extension to Wired Local Area Networks (LANs) and is able to provide the last few meters of connectivity between a wired network and mobile or fixed devices. Referring to FIG. 1, a WLAN is established by an Access Point (AP) connecting to a LAN by an Ethernet cable. The AP typically receives, buffers, and transmits data between the WLAN and the wired network infrastructure. The AP may support, on average, twenty devices and have a coverage varying from 20 meters in an area with obstacles (walls, stairways, elevators etc) to 100 meters in an area with clear line of sight. Bluetooth is an open wireless protocol for exchanging data over short distances from fixed and mobile devices, creating Personal Area Networks (PANs). The cellular phone may receive voice over internet protocol (VoIP) data via the WiFi module and further transmit the VoIP data through an established PAN to the Bluetooth headset, and vice versa. Alternatively, the cellular phone may transmit digital music through the established PAN to be played back in the Bluetooth headset.

Note that the WLAN and Bluetooth systems both occupy a section of the 2.4 GHz Industrial, Scientific, and Medical (ISM) band, which is 83 MHz-wide. As an example shows in FIG. 2, a Bluetooth system uses a Frequency Hopping Spread Spectrum (FHSS) and hops between 79 different 1 MHz-wide channels in a Bluetooth spectrum. A WLAN system carrier remains centered on one channel, which overlaps with a Bluetooth spectrum. When the WiFi module and the Bluetooth module are operating simultaneously in the same area, as shown in FIG. 1, and a Bluetooth transmission occurs on a frequency band that falls within the frequency space occupied by an ongoing WLAN transmission, a certain level of interference may occur, depending on the signal strength thereof. Due to the fact that the WiFi module and Bluetooth module share the same spectrum and also share a single antenna, it is required to prevent the occurrence of interferences therebetween. FIG. 3 is a schematic diagram illustrating interferences between WiFi and Bluetooth modules sharing a single antenna. In FIG. 3, the shared single antenna is switched between WLAN and Bluetooth communication services in a given time slot for transceiving data. If the Bluetooth communication service carries audio data that requires real-time transmission, for example, Synchronous Connection-Oriented (SCO) packets, the Bluetooth communication service would have a higher priority over the WLAN communication service. In this case, when a WLAN transceiving process takes place at the same time as the real-time Bluetooth transceiving process, a time slot will be assigned to the Bluetooth transceiving process and the WLAN transceiving process will be blocked. As shown in FIG. 3, the WLAN receiving operation (Rx operation) 1 occurs in the time slot, while the Bluetooth communication service is idle. Therefore, the Rx operation 1 is performed without interference and an acknowledgement (ACK) message 2 is sent to the WLAN AP (such as the AP in FIG. 1) as a reply message indicating that the Rx operation 1 has been completed. Following the Rx operation 1, another WLAN Rx operation 3 is performed. The Rx operation 3 is also performed without interference because the Bluetooth communication service is in the idle state. However, an ACK message 4 in response to the Rx operation 3 can not be replied to the WLAN AP, as its time slot has already been assigned to the Bluetooth transmitting operation (Tx operation). Accordingly, the Rx operation 3 would be determined to have failed. In response to the failure, the WLAN AP would re-transmit the data frame with a lower data rate in an attempt to successfully transmit data to the WiFi module of the mobile device. Unfavorably, the re-performed Rx operation 3 (denoted as 5), with a prolonged operation period, would be more likely to overlap with the Bluetooth transceiving process. Thus, a data frame would once again be re-transmitted with an even lower data rate than that for the prior re-transmitted data, which would cause even more overlap with the Bluetooth transceiving process than the prior attempt. As a result, because the WLAN and Bluetooth wireless communication services sharing a single antenna are time-division accessed (i.e., only one communication service of WLAN and Bluetooth can be enabled at each time slot), throughput of the WLAN is greatly hindered.

In a general design of such a wireless communication device (e.g., the cellular phone), the WiFi and Bluetooth modules are coupled with a plurality of wires, wherein each of the wires are for communicating specific information concerning the wireless transceiving operations of the WiFi and Bluetooth modules. As shown in FIG. 4, three unidirectional wires are used to carry the information concerning the wireless transceiving operations of the WiFi module to the Bluetooth module, including Tx indicator (i.e., WIFI_TX), Rx indicator (i.e., WIFI_RX), and a transceiving priority indicator (i.e., WIFI_PRIORITY). Referring to FIG. 4, three more unidirectional wires are used to carry the information concerning the wireless transceiving operations of the Bluetooth module to the WiFi module, including a transceiving priority indicator (i.e., BT_PRIORITY), a Tx indicator (i.e., BT_TX), and an Rx indicator (i.e., BT_RX). However, such a signaling interface requires each of the WiFi and Bluetooth modules to have a number of pins corresponding to the number of the wires (e.g., each of the WiFi and Bluetooth modules in FIG. 4 requires six pins for communicating via the wires), and this multi-wire or multi-pin signaling interface results in an additional and unnecessary manufacturing cost and more power consumption.

BRIEF SUMMARY OF THE INVENTION

In light of the previously described problem, there exists a need for a method and an apparatus, in which only one wire is required for coordination between a plurality of wireless communication modules.

One aspect of the invention discloses a wireless communication device comprising a first wireless communication module with a strong driving circuit, and a second wireless communication module with a weak driving circuit. The first wireless communication module is coupled to the second wireless communication module via only one wire. The first wireless communication module sends a first traffic pattern of a first wireless transceiving to the second wireless communication module via the wire, and receives a second traffic of a second wireless transceiving from the second wireless communication module via the wire, where the second traffic pattern indicates whether the second wireless communication module decides to use a remaining period of time, in which the first wireless communication module is not required to perform wireless transceiving, for the second wireless transceiving.

Another aspect of the invention discloses a wireless communication device, comprising a first wireless communication module and a second wireless communication module. The first wireless communication module is configured to perform a first wireless transceiving and communicate with a second wireless communication module using a direct drive operation. The second wireless communication module is configured to perform a second wireless transceiving and communicate with the first wireless communication module using a pull-up/pull-down operation. The first wireless communication module coupled to the second wireless communication module via only one wire. The first wireless communication module sends a first traffic pattern of the first wireless transceiving to the second wireless communication module via the wire, and receives a second traffic of the second wireless transceiving from the second wireless communication module via the wire, where the second traffic pattern indicates whether the second wireless communication module decides to use a remaining period of time, in which the first wireless communication module is not required to perform wireless transceiving, for the second wireless transceiving.

Other aspects and features of the invention will become apparent to those with ordinary skill in the art upon review of the following descriptions of specific embodiments of the wireless communication devices, and the method for the coordination between a plurality of wireless communication modules via only one wire.

BRIEF DESCRIPTION OF THE DRAWINGS

The invention can be more fully understood by reading the subsequent detailed description and examples with references made to the accompanying drawings, wherein:

FIG. 6A is a block diagram illustrating the arbitration of the Bluetooth module 510 requesting for transceiving 2-EV3 packets using the request type mechanism according to an embodiment of the invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
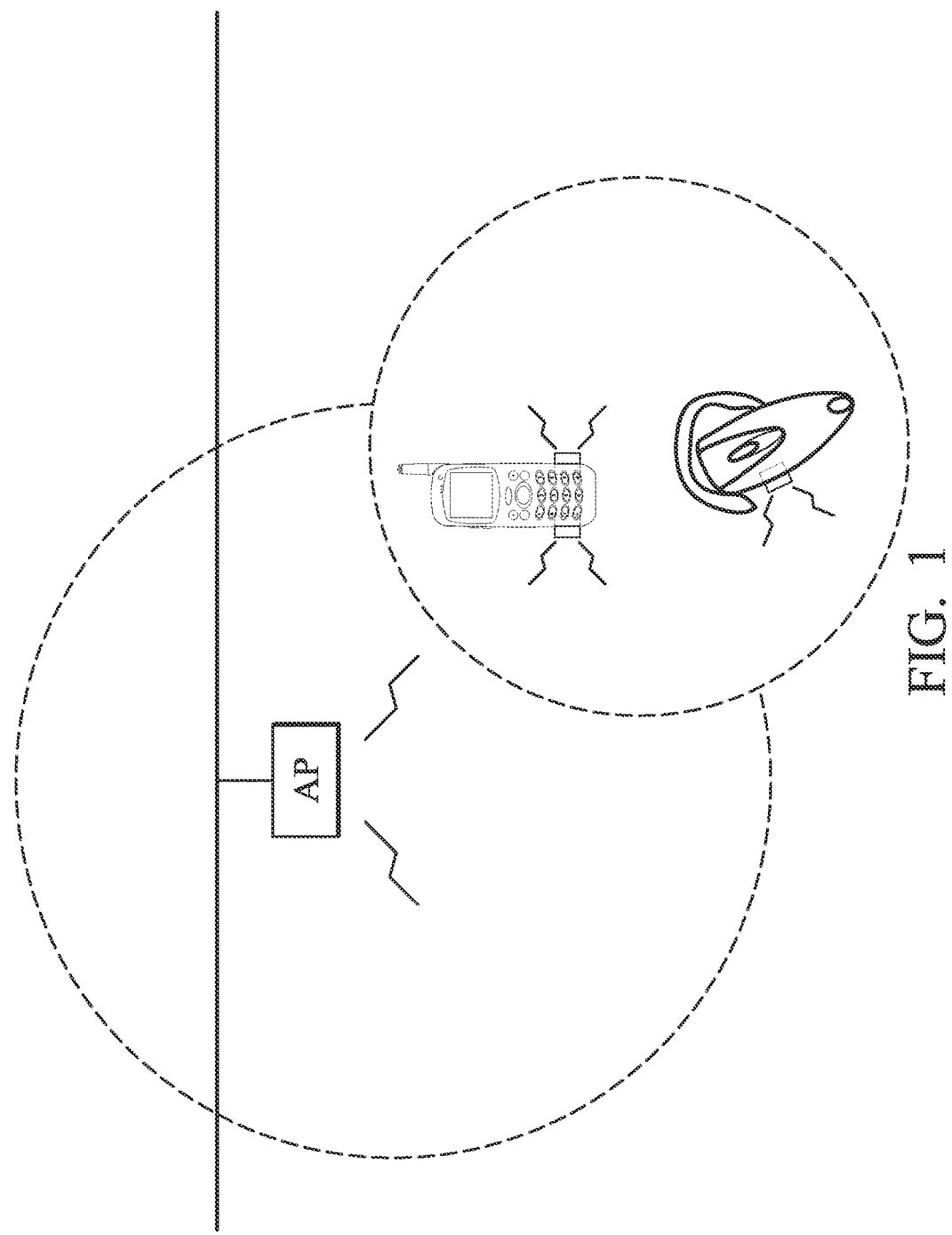
FIG. 1 shows a cellular phone connecting to a Wireless Local Area Network (WLAN) via a WiFi module thereof as well as communicating with a Bluetooth headset through a Bluetooth module thereof.
Figure 2:
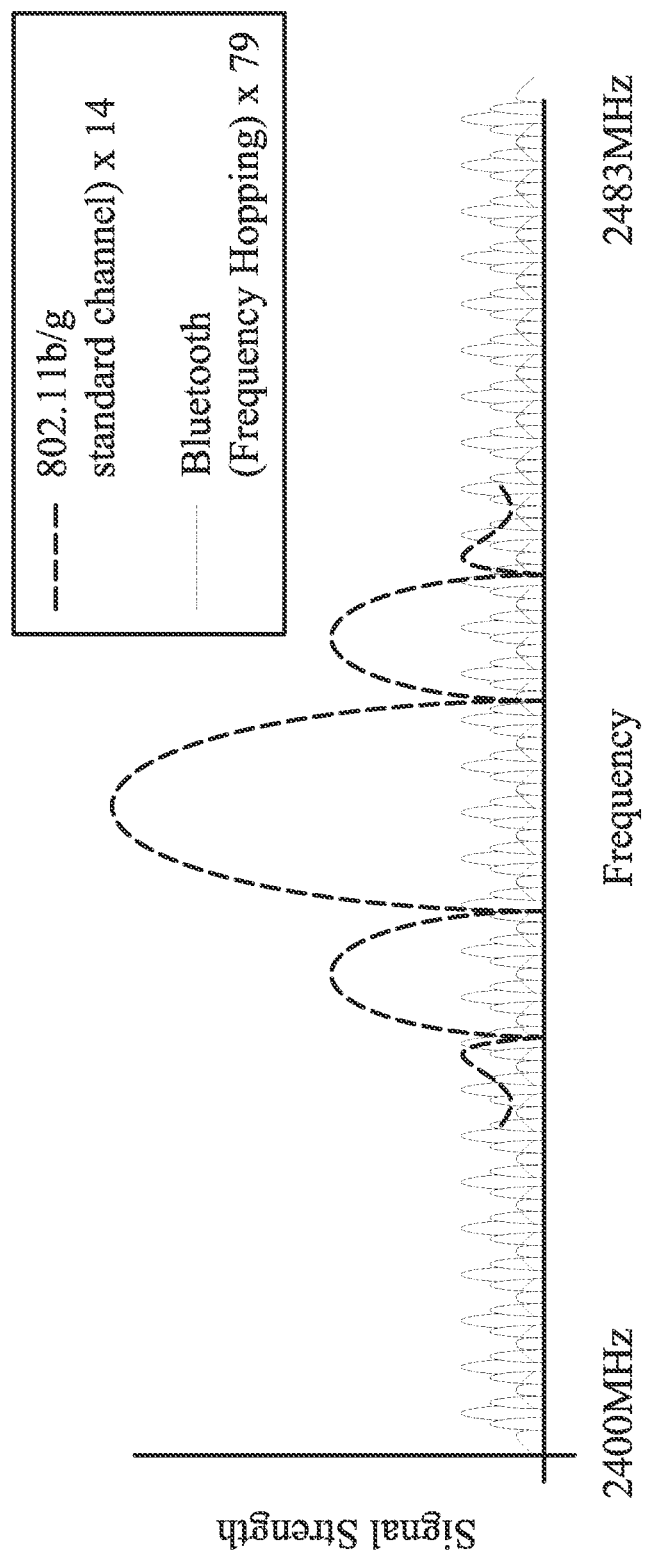
FIG. 2 shows a diagram of Bluetooth frequency Hopping.
Figure 3:
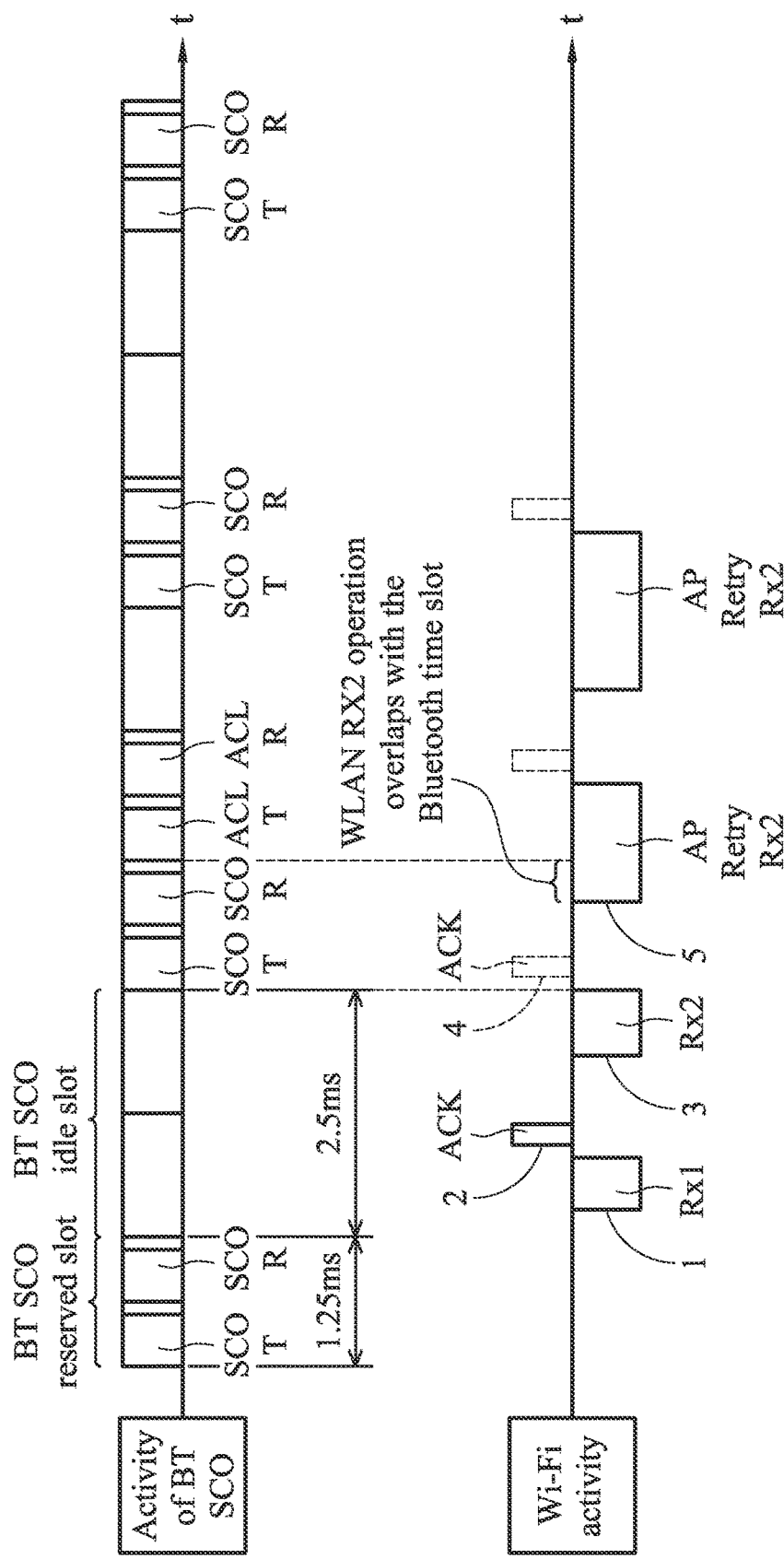
FIG. 3 shows a diagram illustrating operation conflicts between a WiFi and a Bluetooth wireless communication services.
Figure 4:
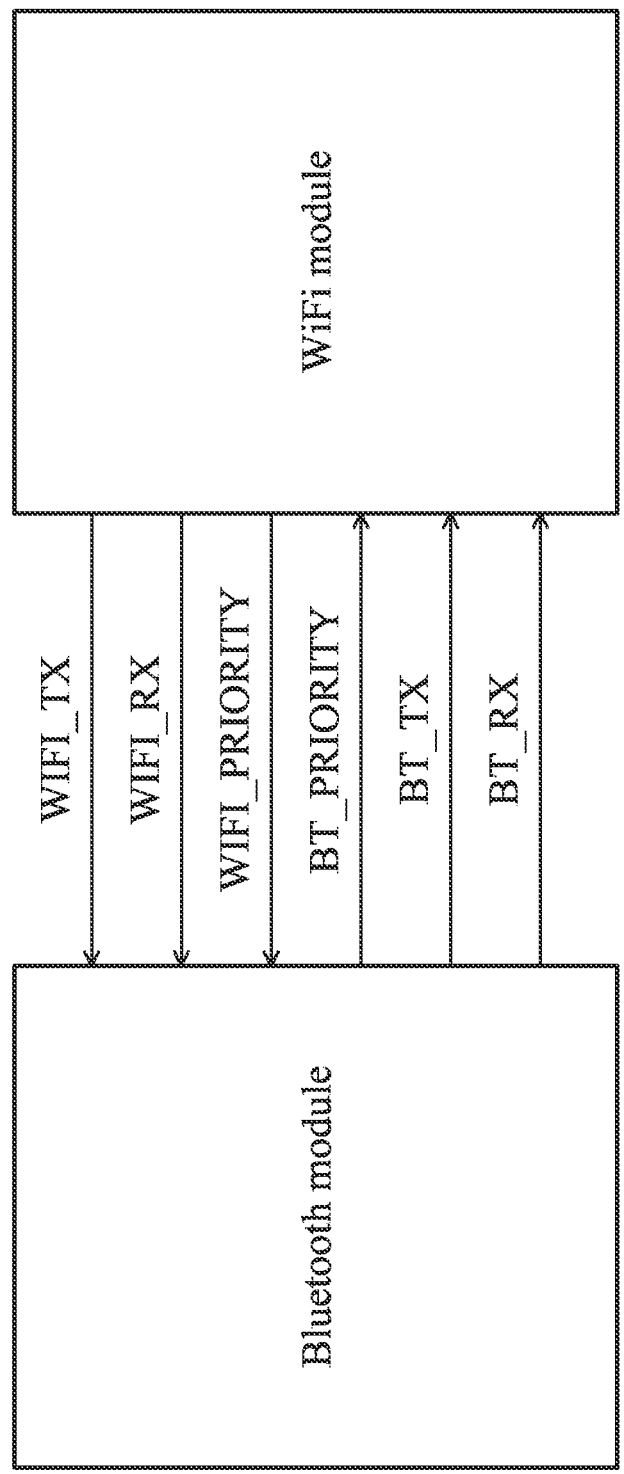
FIG. 4 is a block diagram illustrating a conventional communication interface between a WiFi module and a Bluetooth module.
Figure 5:
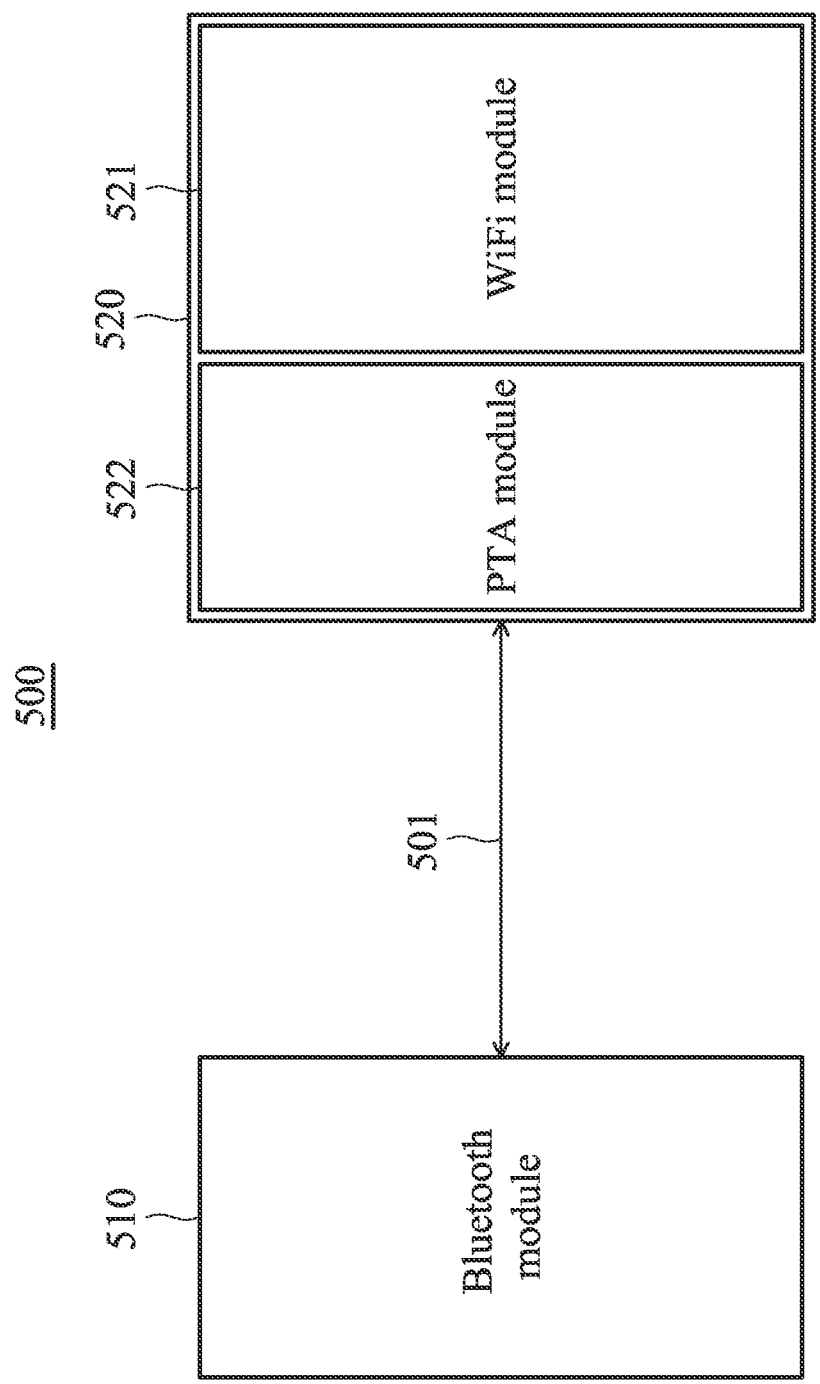
FIG. 5 is a block diagram illustrating a wireless communication device according to an embodiment of the invention.

FIG. 5 is a block diagram illustrating a wireless communication device according to an embodiment of the invention. The wireless communication device 500 comprises a Bluetooth module 510 for Bluetooth communications and a WiFi chipset 520, wherein the Bluetooth module 510 and the WiFi chipset 520 are coupled with only one wire 501. To ease understanding, the WiFi chipset 520 is illustrated with a WiFi module 521 for WiFi communications and a Packet Traffic Arbitrator (PTA) module 522 for coordinating of the Rx/Tx operations of the Bluetooth module 510 and the WiFi module 521 to avoid interferences or collisions therebetween. Although the WiFi module 521 and the PTA module 522 are shown as two separate components, the PTA module 522 may be incorporated into the WiFi module 521, and the Bluetooth module 510 may be coupled to the WiFi module 521 directly. In another embodiment, the wireless communication device 500 may be devised to provide Bluetooth and WiMAX communications capabilities, and the WiFi chipset 520 may be replaced with a WiMAX chipset (not shown) comprising a WiMAX module (not shown) for WiMAX communications and another PTA module (not shown) for coordinating of the Rx/Tx operations of the Bluetooth module 510 and the WiMAX module. Alternatively, the wireless communication device 500 may be devised to provide WiFi and WiMAX communications capabilities, and the Bluetooth module 510 may be replaced with a WiMAX module (not shown), and the invention is not limited thereto. The interoperations between the Bluetooth module 510 and the WiMAX module through the PTA module, and the interoperations between the WiFi module 521 and the WiMAX module through the PTA module, may be deduced by the analogies, and are briefly described herein for brevity.

To further clarify, the invention proposes a request type mechanism and a reservation type mechanism for coordinating of the wireless transceiving operations of the Bluetooth module 510 and the WiFi module 521. In the request type mechanism, both of the Bluetooth module 510 and the WiFi module 521 need to send requests for performing wireless transceiving to the PTA module 522, and the PTA module 522 determines which of the Bluetooth module 510 and the WiFi module 521 is granted to perform wireless transceiving during a specific period of time. When the Bluetooth module 510 is required to perform wireless transceiving (i.e., Rx and/or Tx operations) during a forthcoming period of time, it first determines the traffic pattern and/or status information of the wireless transceiving to be performed, and then sends a request indicating the traffic pattern and/or status information to the PTA module 522 via the wire 501. If the WiFi module 521 does not send a request for performing wireless transceiving during the forthcoming period of time, the PTA module 522 grants the request sent by the Bluetooth module 510. Otherwise, if the WiFi module 521 also sends a request for performing wireless transceiving during the period of time overlapping with the forthcoming period of time, the PTA module 522 determines which of the Bluetooth module 510 and the WiFi module 521 is granted to perform wireless transceiving during the forthcoming period of time. In one embodiment, the status information may include a priority field to the PTA module 522, and when the priority field indicates that the Bluetooth module 510 has a higher priority, the PTA module 522 may determine to grant the request from the Bluetooth module 510 and reject the request from the WiFi module 521, or when the priority field indicates the Bluetooth module 510 has a lower priority, the PTA module 522 may determine to reject the request from the Bluetooth module 510 and grant the request from the WiFi module 521. The status information and the traffic pattern, such as the traffic type of the wireless transceiving (e.g., POLL/NULL packets, HV1 (High quality Voice 1)/HV2/HV3 packets, 2-EV3(Extended Voice 3) packets, or multi-slot packets), and a Tx/Rx indicator, etc, of the wireless transceiving to be performed by the Bluetooth module 510 are carried via the wire 501. The signal on the wire 501 is configured to a high voltage level during a time interval $T_0$ to indicate the start of the request.

After the request is sent via the wire 501, another time interval $T_N$ may be implemented in which the voltage level of the signal on the wire 501 is configured to a low voltage level to indicate the end of the request. After the time interval $T_N$, the PTA module 522 may send a response for indicating whether the request has been accepted to the Bluetooth module 510 via the wire 501. For example, a high voltage level of the signal on the wire 501 may indicate that the request from the Bluetooth module 510 has been accepted, and a low voltage level of the signal on the wire 501 may indicate that the request from the Bluetooth module 510 has been rejected. Meanwhile, the Bluetooth module 510 may measure or detect the voltage level of the signal on the wire 501 during the time interval to determine whether the request has been granted, and if so, start to perform wireless transceiving after a waiting time interval.

FIG. 6A is a block diagram illustrating the arbitration of the Bluetooth module 510 requesting for transceiving 2-EV3 packets using the request type mechanism according to an embodiment of the invention. Prior to a time at 0 μs, the Bluetooth module 510 first sends a first request 601 for performing a Tx operation to the PTA module 522 via the wire 501, and the PTA module 522 grants the first request 601 with a first response 602 via the wire 501. As the first request has been granted, the Bluetooth module 510 then transmits a Bluetooth medium packet 610 at time 0 μs, which has a time period shorter than a Bluetooth slot of 625 μs. Subsequently, prior to a time at 625 μs, the Bluetooth module 510 sends a second request 603 for performing an Rx operation to the PTA module 522 via the wire 501, and the PTA module 522 grants the second request 603 with a second response 604 via the wire 501. As the second request has been granted, the Bluetooth module 510 then receives a Bluetooth medium packet 620 at time 625 μs, which also has a time period shorter than 625 μs. Specifically, the PTA module 522 may grant the first request 601 and the second request 603 as the first request 601 and the second request 603 are high priority requests (i.e., the requested Tx operation and Rx operation are for transmitting and receiving data packets of a delay-sensitive type of services) or the WiFi module 521 is not required to perform wireless transceiving for the same period of time.

Figure 6B:
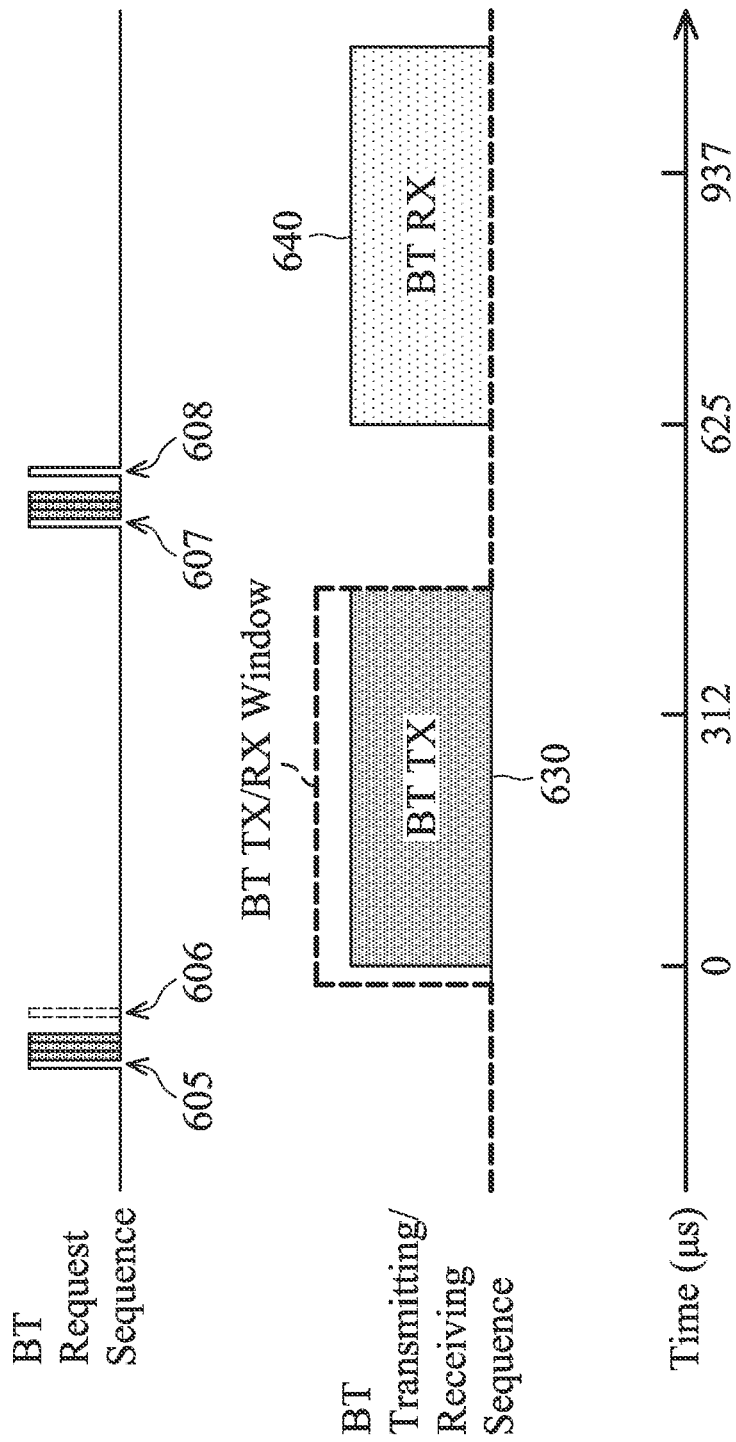
FIG. 6B is a block diagram illustrating the arbitration of the Bluetooth module 510 requesting for transceiving 2-EV3 packets using the request type mechanism according to another embodiment of the invention.

FIG. 6B is a block diagram illustrating the arbitration of the Bluetooth module 510 requesting for transceiving 2-EV3 packets using the request type mechanism according to another embodiment of the invention. Similar to FIG. 6A, a first request 605 sent by the Bluetooth module 510 via the wire 501 is granted by the PTA module 522 with a first response 606 via the wire 501, prior to a time at 0 μs, and the Bluetooth module 510 transmits a Bluetooth medium packet 630 at time 0 μs. Subsequently, the Bluetooth module 510 sends a second request 607 for performing an Rx operation to the PTA module 522 via the wire 501. However, the PTA module 522 rejects the second request 607 with a second response 608 via the wire 501. Specifically, the PTA module 522 may reject the second request 607 as the second request 607 is a low priority request (i.e., the requested Rx operation is for receiving data packets of a delay-tolerant type of services) and the WiFi module 521 also requests for performing wireless transceiving during the same period of time. As the second request has been rejected, the Bluetooth module 510 does not perform an Rx operation to receive the Bluetooth medium packet 640.

Figure 7:
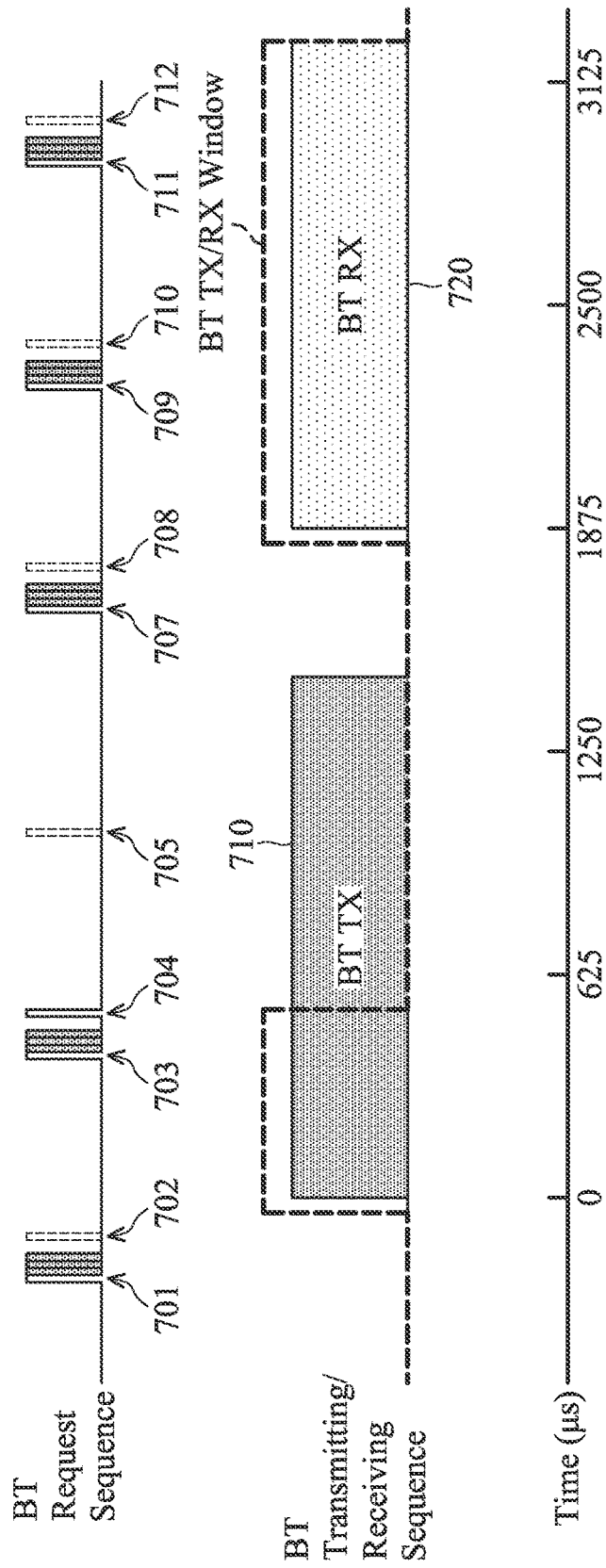
FIG. 7 is a block diagram illustrating the arbitration of the Bluetooth module 510 requesting for transceiving multi-slots packets using the request type mechanism according to an embodiment of the invention.

FIG. 7 is a block diagram illustrating the arbitration of the Bluetooth module 510 requesting for transceiving multi-slots packets using the request type mechanism according to an embodiment of the invention. Since a multi-slot packet has a transmission period greater than 625 μs, transceiving of a multi-slot packet requires more than one time slot. For each request corresponding to wireless transceiving in a time slot, the Bluetooth module 510 sends requests 701, 703, and 705 for transmitting a multi-slot packet 710 via the wire 501, and sends requests 707, 709, and 711 for receiving a multi-slot packet 720 via the wire 501. As the request 701 has been accepted by the PTA module 522, the Bluetooth module 510 starts transmitting the multi-slot packet 710 at time 0 μs. However, when the Bluetooth module 510 sends the request 703 for continuing the transmission of the multi-slot packet 710, the PTA module 522 rejects the request 703 with a response 704, and accordingly, the Bluetooth module 510 stop transmitting the multi-slot packet 710 when receiving the response 704. Therefore, the Bluetooth module 510 does not transmit the complete multi-slot packet 710, and it may resume the transmission of the multi-slot packet 710 from where it stopped in the next transmission period of time. After that, the Bluetooth module 510 successfully receives the entire multi-slot packet 720, as the requests 707, 709, and 711 have been accepted by the PTA module 522.

In the reservation type mechanism, the request includes a remaining window field. When the Bluetooth module 510 is required to perform wireless transceiving, it may send a request to the PTA module 522 via the wire 501, which indicates the remaining period of time of the wireless transceiving according to the traffic pattern of the wireless transceiving. That is, the Bluetooth module 510 one-sidedly decides to perform wireless transceiving and the request is only sent for informing the PTA module 522 of the period of time in which the Bluetooth module 510 is not required to perform wireless transceiving. After sending the request, the Bluetooth module 510 performs wireless transceiving accordingly. When receiving the request from the Bluetooth module 510, the PTA module 522 determines whether to accept the remaining period of time indicated in the request from the Bluetooth module 510 according to the traffic pattern of the WiFi module 521. Specifically, the PTA module 522 first determines whether a request from the WiFi module 521 has been received for performing wireless transceiving, and if so, determines whether the transmission or reception period of the wireless transceiving by the WiFi module 521 is within the remaining period of time. If the transmission or reception period of the wireless transceiving by the WiFi module 521 is within the remaining period of time, the PTA module 522 grants the request from the WiFi module 521, and then replies to the Bluetooth module 510 with a response indicating that the remaining period of time has been accepted. Otherwise, if the transmission or reception period of the wireless transceiving by the WiFi module 521 is not within the remaining period of time, the PTA module 522 rejects the request from the WiFi module 521, and then replies to the Bluetooth module 510 with a response indicating that the remaining period of time has not been accepted (that is, the remaining period is given up by WiFi transceiving). In another situation where WiFi module 521 does not sent a request for performing wireless transceiving during that remaining period of time, the PTA module 522 or WiFi module 521 also replies to the Bluetooth module 510 with a response indicating that the remaining period of time has been given up. Moreover, the traffic pattern of the WiFi module 521 may refer to status of WiFi module 521 (e.g., active mode or sleep mode). When the WiFi module 521 is in the active mode, the PTA module 522 may determine to accept the remaining period of time. However, when the WiFi module 521 is in the sleep mode, the PTA module 522 may determine to not accept the remaining period of time.

Similarly, the signal on the wire 501 may be configured to a high voltage level to indicate the start of the request. The request may be shown as a sequence of high and low voltages on the wire 501. After the request is sent via the wire 501, a time interval $T_{N'}$ may be implemented in which the voltage level of the signal on the wire 501 may be configured to a low voltage level to indicate the end of the request. After the time interval $T_{N'}$, the PTA module 522 may send a response for indicating whether the request has been accepted to the Bluetooth module 510 via the wire 501. To indicate the remaining time period, the reserve type request can directly indicate the start time and the length of the remaining window, or can trigger a counter of the WiFi module 521 (or PTA module 522) to count down a period of time, which provides more flexibility. For example, the reserve request may be used for indicating to the WiFi module 521 to count down a period of time indicated by the remaining window field and to stop performing wireless transceiving until the countdown is over. Each value represented by the remaining window bits may corresponds to a specific remaining period of time or a period of time for countdown, and the correspondence therebetween may be predetermined or pre-negotiated between the Bluetooth module 510 and the PTA module 522. For example, in the situation where two remaining window bits are included in the request from the Bluetooth module 510, the remaining window bits with a value of '00' may be corresponding to a remaining period of time of 0 μs, the remaining window bits with a value of '01' may be corresponding to a remaining period of time of 312 μs, the remaining window bits with a value of '10' may be corresponding to a remaining period of time of 625 μs, and the remaining window bits with a value of '10' may be corresponding to a remaining period of time of 1250 μs.

Figure 8:
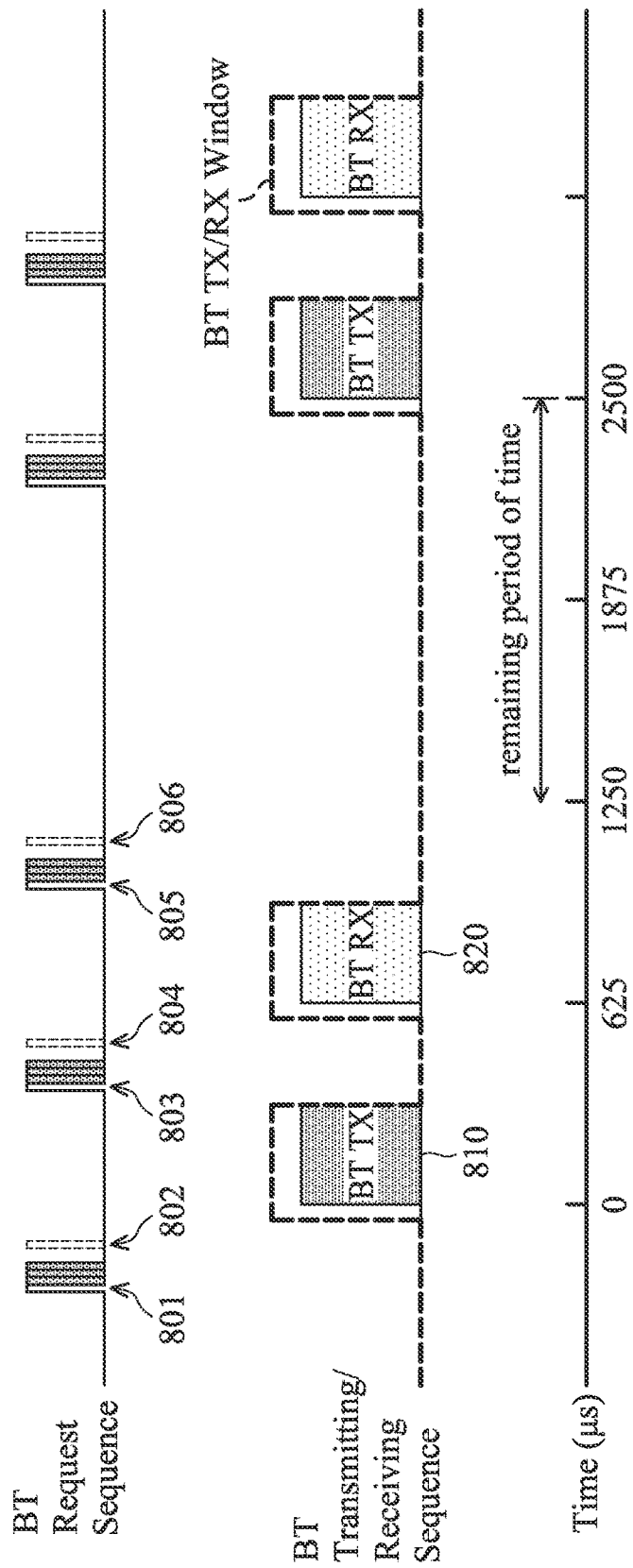
FIG. 8 is a block diagram illustrating the coordination between the operations of the Bluetooth module 510 and the WiFi module 521 using the reservation type mechanism according to an embodiment of the invention.

FIG. 8 is a block diagram illustrating the coordination between the operations of the Bluetooth module 510 and the WiFi module 521 using the reservation type mechanism according to an embodiment of the invention. Prior to a time at 0 μs, the Bluetooth module 510 first sends a request 801 to the PTA module 522 via the wire 501, which indicates a remaining period of time of 0 μs. In response to the remaining period of time having a zero value, the PTA module 522 requests the WiFi module 521 to stop performing wireless transceiving, and replies to the Bluetooth module 510 with a response 802 via the wire 501, which indicates that the remaining period of time has been accepted. As the remaining period of time of 0 μs has been accepted, the Bluetooth module 510 then transmits a Bluetooth medium packet 810 at time 0 μs. Then, for receiving a Bluetooth medium packet 820 at time 625 μs, another request 803 is sent from the Bluetooth module 510 to the PTA module 522 via the wire 501, and the PTA module 522, in this example, grants the request 803 with a response 804. After the Bluetooth medium packets 820 are received, the Bluetooth module 510 sends a request 805 to the PTA module 522 via the wire 501, which indicates a remaining period of time of 1250 μs, since the Bluetooth module 510 is not required to perform wireless transceiving until a time at 2500 μs. In response to the remaining period of time having a non-zero value (i.e., 1250 μs), the PTA module 522 further determines whether to grant the request from the WiFi module 521 for performing wireless transceiving according to the remaining period of time and the traffic pattern of the wireless transceiving to be performed by the WiFi module 521. Specifically, if the traffic pattern indicates that the wireless transceiving is to be performed during the remaining period of time, the PTA module 522 grants the request from the WiFi module 521 and replies to the Bluetooth module 510 with a response 806 indicating that the remaining period of time has been accepted. Otherwise, if the traffic pattern indicates that the wireless transceiving is not to be performed during the remaining period of time, the PTA module 522 rejects the request from the WiFi module 521 and replies to the Bluetooth module 510 with a response indicating that the remaining period of time has not been accepted. Assuming that the remaining period of time has been accepted in this embodiment, the Bluetooth module 510 does not perform wireless transceiving during the remaining period of time. In another embodiment, if the remaining period of time has not been accepted, the Bluetooth module 510 may continue the wireless transceiving during the remaining period of time, if required.

Figure 9:
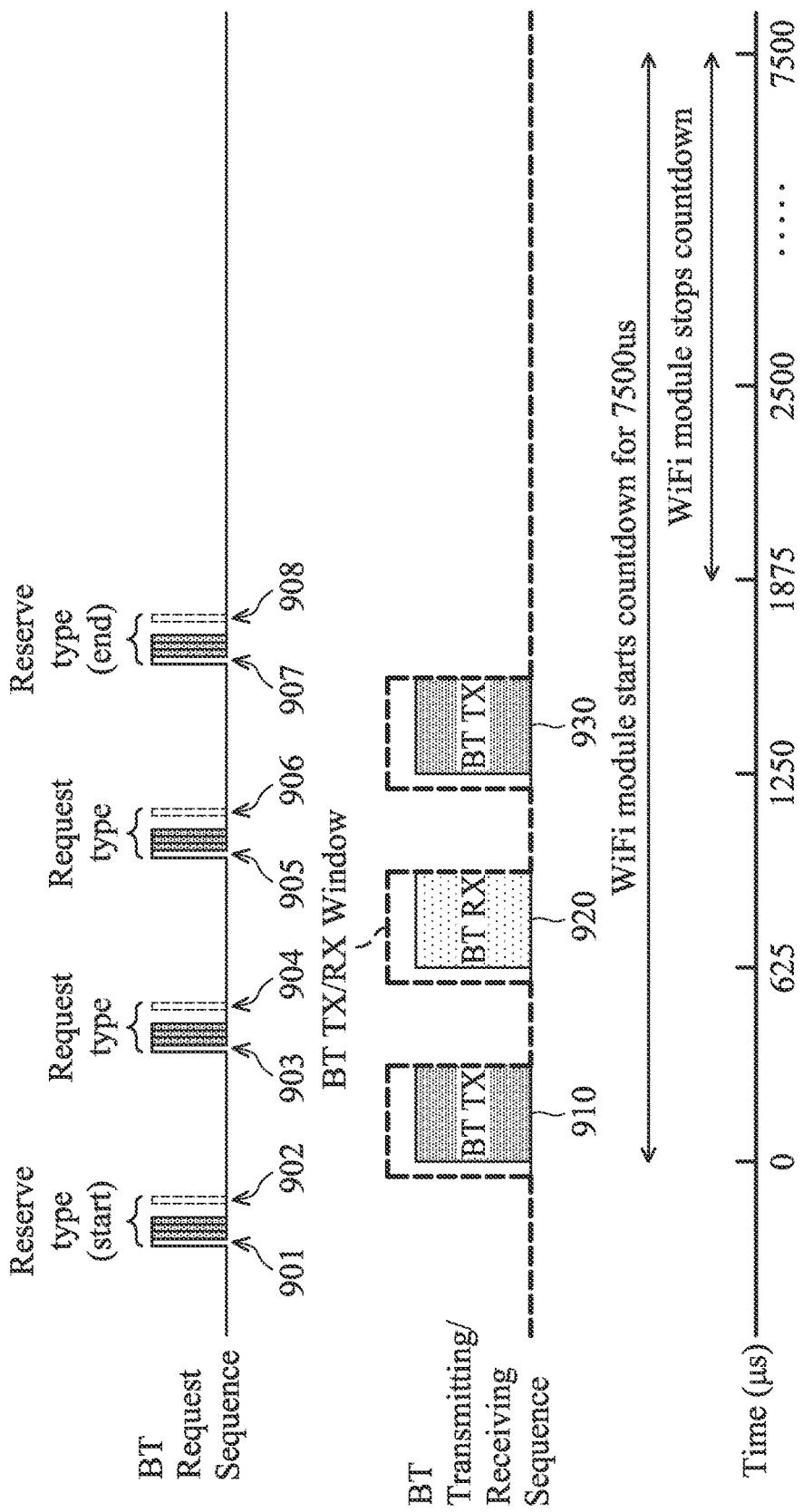
FIG. 9 is a block diagram illustrating the coordination between the operations of the Bluetooth module 510 and the WiFi module 521 using the reservation type mechanism according to another embodiment of the invention.

FIG. 9 is a block diagram illustrating the coordination between the operations of the Bluetooth module 510 and the WiFi module 521 using the reservation type and request type mechanisms according to another embodiment of the invention. In this embodiment, the Bluetooth module 510 is required to perform an Extended Synchronize Connection Oriented (eSCO) type transceiving at time 0 μs, wherein the eSCO type of communication is configured with a cycle period $T_{esco}$ of 12 Bluetooth time slots and a retransmission window $W_{esco}$ of 4 Bluetooth time slots. Prior to a time at 0 μs, the Bluetooth module 510 first sends a countdown request 901 to the PTA module 522 via the wire 501, which indicates a countdown value of 7500 μs (i.e., the length of 12 Bluetooth time slots) by the remaining window bits. In response the countdown request, the PTA module 522 rejects any request from the WiFi module 521 for performing wireless transceiving, and replies to the Bluetooth module 510 with a response 902 via the wire 501, which indicates that the countdown value indicated by the remaining window bits has been accepted. Specifically, the PTA module 522 requests the WiFi module 521 to start a countdown for 7500 μs and not perform wireless transceiving until the countdown is over. Note that, the correspondence between the countdown value and the remaining window bits may be predetermined or pre-negotiated between the Bluetooth module 510 and the PTA module 522. As the countdown value indicated by the remaining window bits has been accepted, the Bluetooth module 510 then performs the Tx operation 910 at time 0 μs. Due to the fact that the eSCO type of communication is configured with a cycle period $T_{esco}$ of 12 Bluetooth time slots and a retransmission window $W_{esco}$ of 4 Bluetooth time slots, the Bluetooth module 510 may dynamically occupy 3, 4, 5, or 6 Bluetooth time slots. In this embodiment, when the Bluetooth transceiving is determined to be finished after 3 Bluetooth time slots from time 0 μs, the Bluetooth module 510 sends an end request 907 to the PTA module 522 via the wire 501 at time 1875 μs. In response to the end request 907, the PTA module 522 requests the WiFi module 521 to stop the countdown, and grants the request (if any) from the WiFi module 521 for performing wireless transceiving. Also, the PTA module 522 replies to the Bluetooth module 510 with a response 908 via the wire 501, which indicates that the request has been accepted. Moreover, two pairs of request and response (i.e., the pair of request 903 and response 904 and the pair of request 905 and response 906) are sent prior to the BT TX operation 920 and BT RX operation 930, respectively, in case WiFi module 521 overlooks the previous request (for example, WiFi module 521 may be in sleep mode until time 625 μs).

Figure 10:
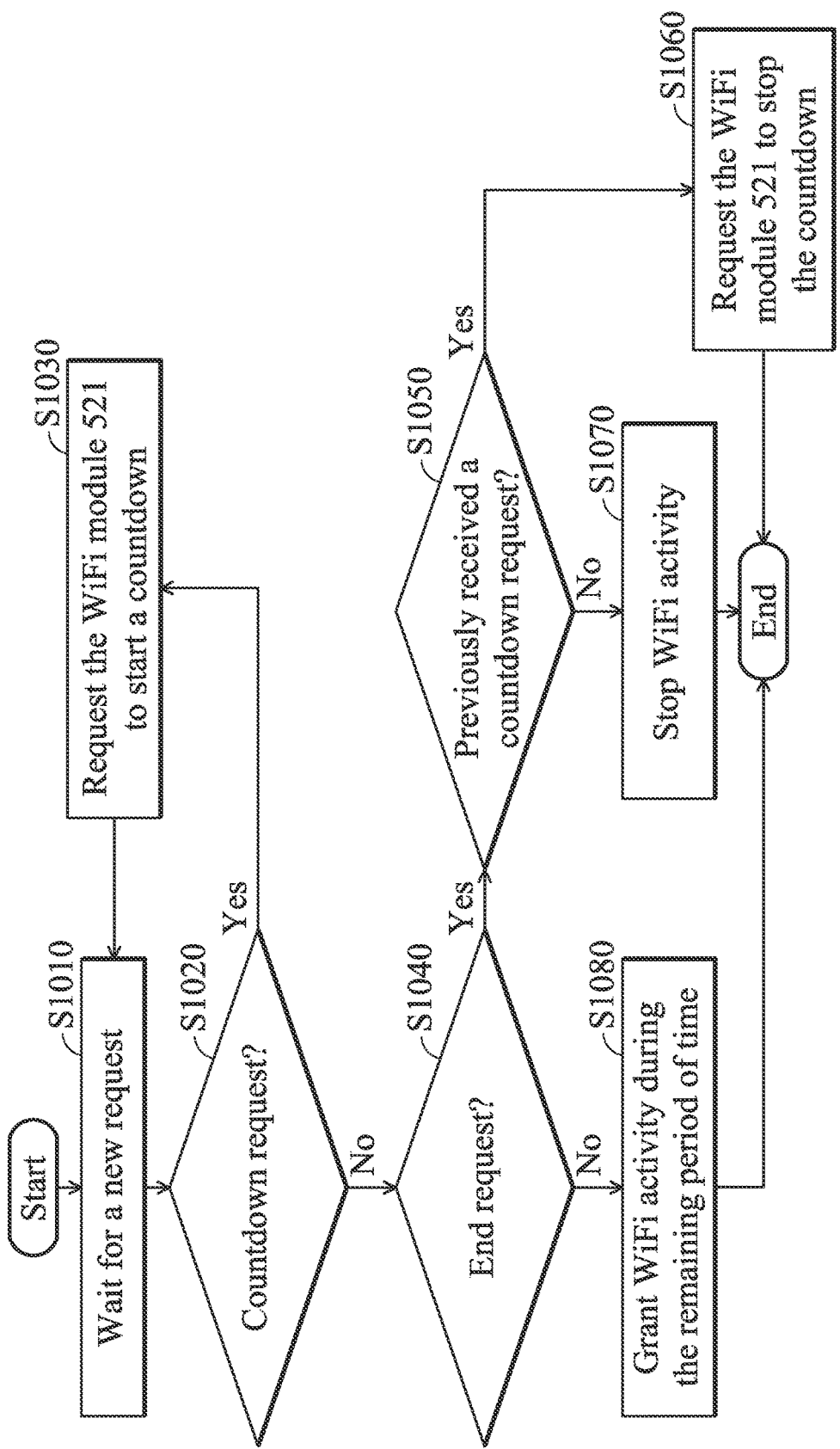
FIG. 10 is a flow chart illustrating the operation of the PTA module 522 for coordination between the Bluetooth module 510 and the WiFi module 521 using the reservation type mechanism according to an embodiment of the invention.

FIG. 10 is a flow chart illustrating the operation of the PTA module 522 for coordination between the Bluetooth module 510 and the WiFi module 521 using the reservation type mechanism according to an embodiment of the invention. To begin, the PTA module 522 waits for a new request from the Bluetooth module 510 (step S1010). When a request is received from the Bluetooth module 510, the PTA module 522 determines whether it is a countdown request (step S1020). If so, the PTA module 522 requests the WiFi module 521 to start a countdown according to the remaining window bits and not perform wireless transceiving until the countdown is over (step S1030). Subsequent to step S1230, the flow goes back to step S1210 in which the PTA module 522 waits for another request from the Bluetooth module 510. Subsequent to step S1020, if it is not a countdown request, the PTA module 522 determines whether it is an end request (step S1040), and if so, further determines whether a countdown request has been received previously (step S1050). If a countdown request has been received previously, the PTA module 522 requests the WiFi module 521 to stop the countdown (step S1060). Once the countdown is stopped, the WiFi module 521 may send a request to the PTA module 522 for performing wireless transceiving, and the PTA module 522 may grant the request from the WiFi module 521 since the Bluetooth module 510 is no longer required to perform wireless transceiving during a forthcoming period of time. Subsequent to step S1050, if a countdown request has not been received previously, the PTA module 522 requests the WiFi module 521 to stop performing wireless transceiving (step S1070). Subsequent to step S1040, if the received request is not an end request, the PTA module 522 may grant the request from the WiFi module 521 for performing wireless transceiving during the remaining period of time indicated by the remaining window bits of the received request (step S1080).

Figure 11:
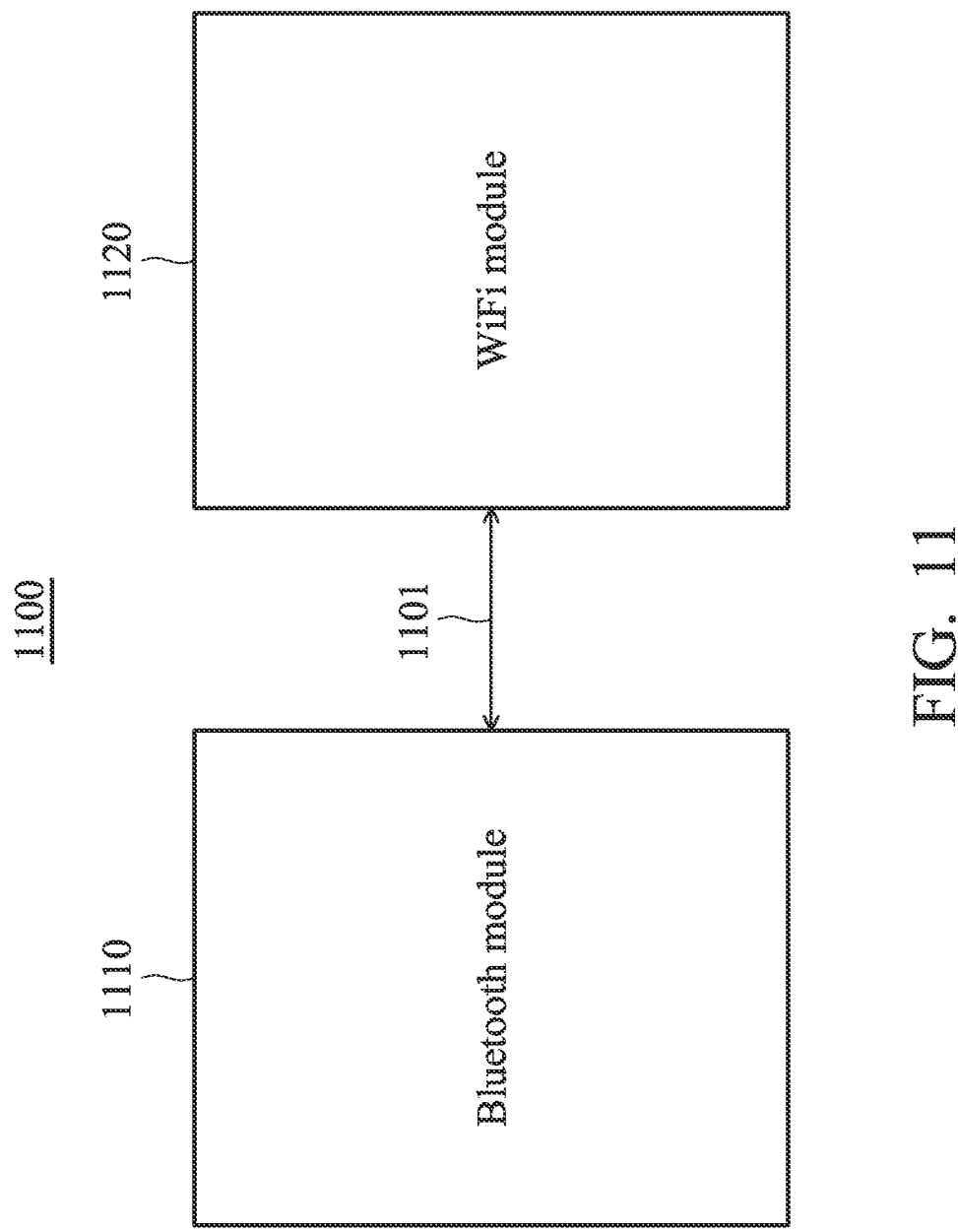
FIG. 11 is a block diagram illustrating a wireless communication device according to another embodiment of the invention.

In addition, the invention proposes implementations for one-wire interface which enables two modules (e.g. Bluetooth 510 and WiFi 520) to send messages bi-directionally. As illustrated in FIG. 11, the wireless communication device 1100 comprises a Bluetooth module 1110 for Bluetooth communications and a WiFi module 1120, wherein the Bluetooth module 1110 and the WiFi module 1120 are coupled with only one wire 1101. In another embodiment, the wireless communication device 1300 may be devised to provide Bluetooth and WiMAX communications capabilities, and the WiFi module 1120 may be replaced with a WiMAX module (not shown) for WiMAX communications. Alternatively, the wireless communication device 1100 may be devised to provide WiFi and WiMAX communications capabilities, and the Bluetooth module 1110 may be replaced with a WiMAX module, and the invention is not limited thereto. The interoperations between the Bluetooth module 1110 and the WiMAX module, and the interoperations between the WiFi module 1120 and the WiMAX module, may be deduced by the analogies, and are briefly described herein for brevity.

Figure 12:
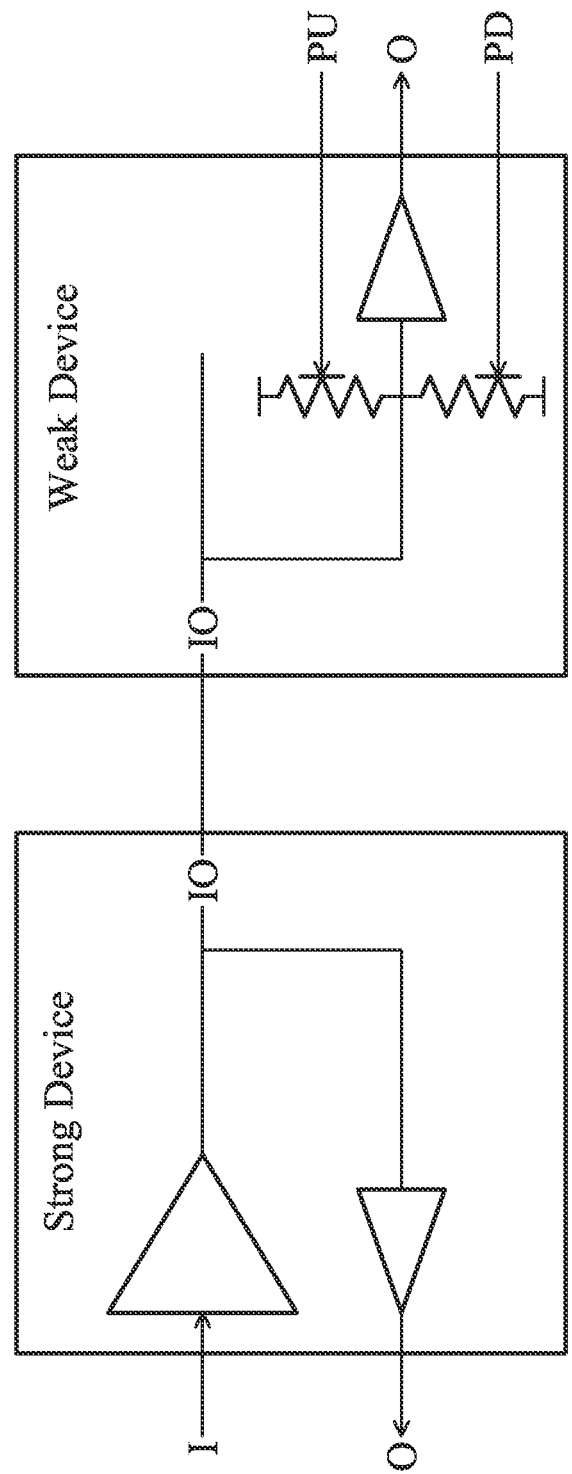
FIG. 12 is a block diagram illustrating an exemplary programmable circuit with one strong device and one weak device according to an embodiment of the invention.

In the first implementation of the one-wire interface for exchanging information of the wireless transceiving operations between the Bluetooth module 1110 and the WiFi module 1120 via the wire 1101, one of the Bluetooth module 1110 and the WiFi module 1120 is configured to always be in an input mode with a weak driving ability, and the other one of the Bluetooth module 1110 and the WiFi module 1120 is configured to be in an input mode or an output mode with a strong driving ability. Specifically, the one in the output mode may send serial data via the wire 1101, while the one in the input mode may read the state of the wire 1101 to receive the message. The one in the input mode with the weak driving ability may also send data via the wire 1101;

however, since its driving ability is weaker, the data can only be read when the other module is also in the input mode (not driving the wire 1101). In this way, power consumption and latency issue can be improved. In one embodiment, the Bluetooth module 1110 is configured to always be in the input mode, while the WiFi module 1120 may be selectively configured to be in the input mode or output mode. Since the Bluetooth module 1110 is always in the input mode, the WiFi module 1120 may be configured to be in the output mode for outputting data at any time, or configured to be in the input mode for reading the state of the wire 1101. Specifically, the WiFi module 1120 may comprises a strong driving circuit, such as a driver/amplifier, while the Bluetooth module 1110 may comprise a weak driving circuit, such as pull-up and pull-down resistors for driving the wire 1101 to indicate a state when the WiFi module 1120 is not driving the wire. More specifically, the wire 1101 is driven to 'high' when the pull-up path (comprising the pull-up resistor) is enabled and the pull-down path (comprising the pull-down resistor) is disabled, and the wire 1101 is driven to 'low' when the pull-up path is disabled and the pull-down path is enabled. FIG. 12 is a block diagram illustrating an exemplary programmable circuit with one strong device and one weak device according to an embodiment of the invention. The weak device may be implemented in the Bluetooth module 1110, and the strong device may be implemented in the WiFi module 1120. In one embodiment, when the Bluetooth module 1110 is switching the pull-up or pull-down resistors to indicate the state, it may temporarily suspend the receiving process via the wire 1101 to prevent reading of unstable signals which may be falsely regarded as serial data from the WiFi module 1120.

In one embodiment, the WiFi module 1120 may first be configured to be in the output mode for outputting serial data to the Bluetooth module 1110 via the wire 1101, and then configured to be in the input mode for reading the state of the wire 1101. In another embodiment, the WiFi module 1120 may first be configured to be in the input mode for reading the state of the wire 1101, and then configured to be in the output mode for outputting serial data to the Bluetooth module 1110 via the wire 1101. The serial data may comprise information of the wireless transceiving operations of the WiFi module 1120, such as the frame synchronization information for the Bluetooth module 1110 to synchronize with the frame timing of the WiFi module 1120, the Rx activity information for indicating whether the WiFi module 1120 is performing Rx operations in the Rx durations, and the operation status information for indicating whether the WiFi module 1120 is operating in a sleep mode or transceiving mode, etc. In one embodiment, the WiFi module 1120 may send a preamble prior to the start of the serial data, to indicate the Bluetooth module 1110 of that the serial data is going to be sent. The read state may indicate the information concerning the wireless transceiving operations of the Bluetooth module 1110, such as the priority information for indicating whether the wireless transceiving operation has a high priority, and the transceiving type information for indicating whether the wireless transceiving operations are Tx operations or Rx operations, etc. In addition, the state may be predefined and pre-negotiated between the Bluetooth module 1110 and the WiFi module 1120 before the exchange of information therebetween.

In the second implementation of the one-wire interface for exchanging information of the wireless transceiving operations between the Bluetooth module 1110 and the WiFi module 1120 via the wire 1101, one of the Bluetooth module 1110 and the WiFi module 1120 is configured to be an initiator for exchanging information, while the other one of the Bluetooth module 1110 and the WiFi module 1120 is configured to be a responder. Specifically, only the initiator may send serial data via the wire 1101 whenever it is required to, and the responder may only send serial data via the wire 1101 in response to receiving the serial data from the initiator. In one embodiment, the WiFi module 1120 is configured to be the initiator and the Bluetooth module 1110 is configured to be the responder. As an initiator, the WiFi module 1120 is configured to be in the output mode when it is required to send serial data via the wire 1101 or when it needs to obtain the information concerning the wireless transceiving operations of the Bluetooth module 1110, and is then configured to be in the input mode after sending the serial data. The serial data may comprise information of the wireless transceiving operations of the WiFi module 1120. As a responder, the Bluetooth module 1110 is configured to be in the input mode by default for receiving the serial data from the WiFi module 1120 via the wire 1101, and after receiving serial data from the Bluetooth module 1110 via the wire 1101, is configured to be in the output mode for sending serial data comprising the information concerning the wireless transceiving operations of the Bluetooth module 1110 to the WiFi module 1120 via the wire 1101.

Figure 13:
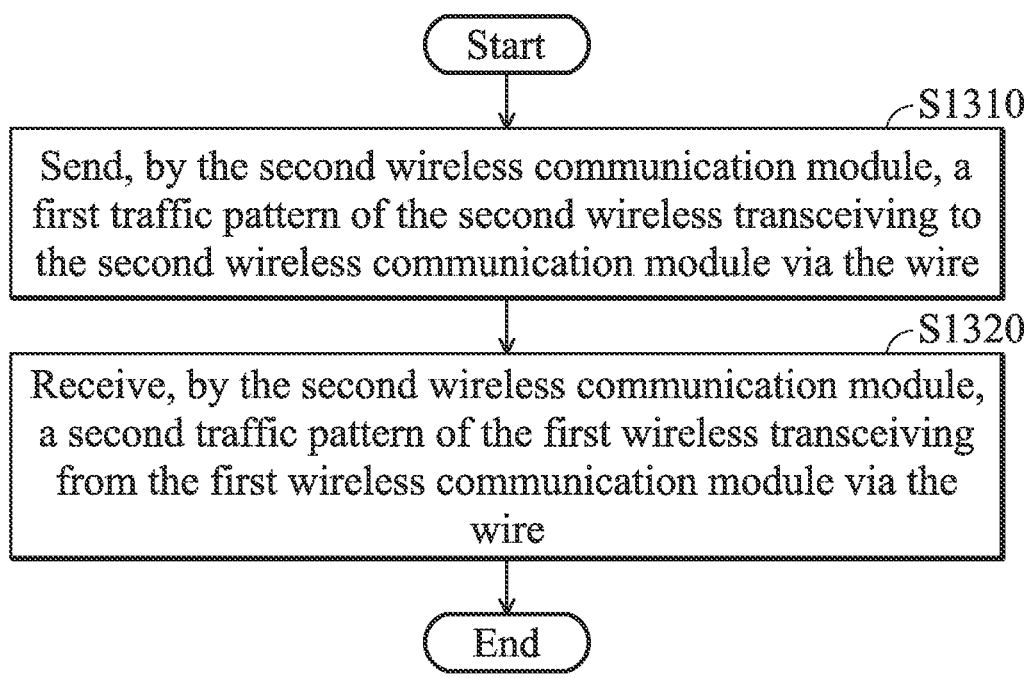
FIG. 13 is a flow chart illustrating the method for exchanging information of the wireless transceiving operations between a plurality of wireless communication modules via an one-wire interface according to an embodiment of the invention.

FIG. 13 is a flow chart illustrating the method for exchanging information of the wireless transceiving operations between a plurality of wireless communication modules with an one-wire interface according to an embodiment of the invention. In this embodiment, the method is applied in a wireless communication device comprising a first wireless communication module and a second wireless communication module, wherein the first wireless communication module is configured for performing first wireless transceiving and the second wireless communication module is configured for performing second wireless transceiving. Particularly, the first and second wireless communication modules are coupled with only one wire. To begin, the second wireless communication module sends a first traffic pattern of the second wireless transceiving to the second wireless communication module via the wire (step S1310). After that, the second wireless communication module receives a second traffic pattern of the first wireless transceiving from the first wireless communication module via the wire (step S1320). In one embodiment, the second wireless communication module may be configured to always be in an input mode, and may comprise one or more pull-up or pull-down resistors for driving the wire to indicate the second traffic pattern when the first wireless communication module is not driving the wire, while the first wireless communication module may be configured to be in an output mode when it is required to send the first traffic pattern via the wire, or may be configured to be in an input mode when it needs to obtain the second traffic pattern by reading the state of the wire. Prior to sending the first traffic pattern, the first wireless communication module may send a preamble for indicating that the first traffic pattern is about to be sent. Particularly, the second wireless communication module may suspend the receiving process via the wire when configuring the pull-up or pull-down resistors to generate the second traffic pattern. In another embodiment, the first wireless communication module may be configured to be an initiator for exchanging information with the second wireless communication module, and the second wireless communication module may be configured to be a responder. As an initiator, the first wireless communication module may be configured to be in the output mode when it is required to send the first traffic pattern or when it needs to obtain the second traffic pattern, and may be configured to be in the input mode after sending the first traffic pattern. As a responder, the second wireless communication module may be configured to be in the input mode by default for receiving the first traffic pattern, and may be configured to be in the output mode for sending the second traffic pattern when receiving the first traffic pattern.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wireless communication device, comprising:
a first wireless communication module, configured to perform a first wireless transceiving, wherein the first wireless communication module comprises a strong driving circuit; and
a second wireless communication module, configured to perform a second wireless transceiving,
wherein the second wireless communication module comprises a weak driving circuit, and the first wireless communication module is coupled to the second wireless communication module via only one wire, and when the weak driving circuit drives the wire for sending data and the strong driving circuit drives the wire for outputting data simultaneously, only data output by the strong driving circuit is received by the weak driving circuit via the wire, and data sent by the weak driving circuit is not received by the strong driving circuit via the wire, and the first wireless communication module sends a first traffic pattern of the first wireless transceiving to the second wireless communication module via the wire, and receives a second traffic pattern of the second wireless transceiving from the second wireless communication module via the wire, and
wherein the second traffic pattern indicates whether the second wireless communication module decides to use a remaining period of time, in which the first wireless communication module is not required to perform wireless transceiving, for the second wireless transceiving.

2. A wireless communication device, comprising:
a first wireless communication module, configured to perform a first wireless transceiving, wherein the first wireless communication module comprises a strong driving circuit; and
a second wireless communication module, configured to perform a second wireless transceiving,
wherein the second wireless communication module comprises a weak driving circuit, and the first wireless communication module is coupled to the second wireless communication module via only one wire, the first wireless communication module sends a first traffic pattern of the first wireless transceiving to the second wireless communication module via the wire, and receives a second traffic pattern of the second wireless transceiving from the second wireless communication module via the wire, and
wherein the strong driving circuit has both an input mode and an output mode, and when the weak driving circuit drives the wire for sending data and the strong driving circuit drives the wire for outputting data simultaneously, only data output by the strong driving circuit is received by the weak driving circuit via the wire, and data sent by the weak driving circuit is not received by the strong driving circuit via the wire.

3. The wireless communication device as claimed in claim 2, wherein the first wireless communication module is configured to be in the output mode for sending the first traffic pattern, and the first wireless communication module is configured to be in the input mode for receiving the second traffic pattern.

4. The wireless communication device as claimed in claim 2, wherein the strong driving circuit comprises a driver or an amplifier.

5. The wireless communication device as claimed in claim 2, wherein the strong driving circuit comprises a direct drive circuit.

6. The wireless communication device as claimed in claim 2, wherein the weak driving circuit comprises a pull-up resistor and a pull-down resistor.

7. The wireless communication device as claimed in claim 6, wherein the weak driving circuit generates the second traffic pattern.

8. The wireless communication device as claimed in claim 7, wherein the second wireless communication module further suspends a receiving process via the wire when configuring the pull-up or pull-down resistor to generate the second traffic pattern.

9. The wireless communication device as claimed in claim 2, wherein the second wireless communication module comprises a Bluetooth device.

10. The wireless communication device as claimed in claim 2, wherein the second wireless communication module comprises a PTA (Packet Traffic Arbitrator) module.

11. The wireless communication device as claimed in claim 2, wherein the second wireless communication module comprises a Wifi device.

12. The wireless communication device as claimed in claim 2, wherein the first wireless communication module comprises a Bluetooth device.

13. The wireless communication device as claimed in claim 2, wherein the first wireless communication module comprises a PTA (Packet Traffic Arbitrator) module.

14. A wireless communication device, comprising:
a first wireless communication device, configured to perform a first wireless transceiving and communicate with a second wireless communication device using a direct drive operation; wherein the first wireless communication device comprises a strong driving circuit; and
the second wireless communication device, configured to perform a second wireless transceiving and communicate with the first wireless communication device using a pull-up/pull-down operation, wherein the second wireless communication device comprises a weak driving circuit;
wherein the first wireless communication device is coupled to the second wireless communication device via only one wire, the first wireless communication device sends a first traffic pattern of the first wireless transceiving to the second wireless communication device via the wire, and receives a second traffic pattern of the second wireless transceiving from the second wireless communication device via the wire, and
wherein the first wireless communication device has both an input mode and an output mode, and when the weak driving circuit drives the wire for sending data and the strong driving circuit drives the wire for outputting data simultaneously, only data output by the strong driving circuit is received by the weak driving circuit via the wire, and data sent by the weak driving circuit is not received by the strong driving circuit via the wire.

15. The wireless communication device as claimed in claim 14, wherein the second traffic pattern indicates whether the second wireless communication device decides to use a remaining period of time, in which the first wireless communication device is not required to perform wireless transceiving, for the second wireless transceiving.

16. The wireless communication device as claimed in claim 14, wherein the first wireless communication device is configured to be in the output mode for sending the first traffic pattern, and the first wireless communication device is configured to be in the input mode for receiving the second traffic pattern.

17. The wireless communication device as claimed in claim 14, wherein the strong drive circuit comprise a driver or an amplifier to perform the direct drive operation.

18. The wireless communication device as claimed in claim 14, wherein the weak drive circuit comprising a pull-up resistor and a pull-down resistor to perform the pull-up/pull-down operation.

19. The wireless communication device-as claimed in claim 18, wherein the weak drive circuit generates the second traffic pattern.

20. The wireless communication device as claimed in claim 19, wherein the second wireless communication device further suspends a receiving process via the wire when configuring the pull-up or pull-down resistor to generate the second traffic pattern.

21. The wireless communication device as claimed in claim 14, wherein the second wireless communication device comprises a Bluetooth device.

22. The wireless communication device as claimed in claim 14, wherein the second wireless communication device comprises a PTA (Packet Traffic Arbitrator) module.

* * * * *